(12) United States Patent
Merrells

(10) Patent No.: US 9,485,332 B2
(45) Date of Patent: Nov. 1, 2016

(54) OFFLOADING EXECUTION OF A PORTION OF A CLIENT-SIDE WEB APPLICATION TO A SERVER

(71) Applicant: Sencha, Inc., Redwood City, CA (US)

(72) Inventor: John Merrells, Menlo Park, CA (US)

(73) Assignee: Sencha, Inc., Redwood City, CA (US)

( * ) Notice: Subject to any disclaimer, the term of this patent is extended or adjusted under 35 U.S.C. 154(b) by 443 days.

(21) Appl. No.: 14/189,811

(22) Filed: Feb. 25, 2014

(65) Prior Publication Data

US 2014/0280509 A1    Sep. 18, 2014

Related U.S. Application Data

(60) Provisional application No. 61/788,889, filed on Mar. 15, 2013.

(51) Int. Cl.
*G06F 15/16* (2006.01)
*H04L 29/06* (2006.01)
*H04L 29/08* (2006.01)

(52) U.S. Cl.
CPC .............. *H04L 67/42* (2013.01); *H04L 67/02* (2013.01); *H04L 67/40* (2013.01)

(58) Field of Classification Search
CPC ............. H04L 29/08072; H04L 29/06; H04L 29/0809

USPC ................ 709/203, 220, 224, 227, 228, 229
See application file for complete search history.

(56) References Cited

U.S. PATENT DOCUMENTS

| | | | |
|---|---|---|---|
| 2010/0048292 A1* | 2/2010 | Anderson | G07F 17/3227 463/25 |
| 2010/0149091 A1* | 6/2010 | Kota | G06T 11/00 345/156 |
| 2013/0104100 A1* | 4/2013 | Mueller | G06F 9/44 717/106 |

* cited by examiner

*Primary Examiner* — Richard G Keehn
*Assistant Examiner* — Van Kim T Nguyen
(74) *Attorney, Agent, or Firm* — Hickman Palermo Becker Bingham LLP; Adam C. Stone

(57) ABSTRACT

Offloading execution of a portion of a client-side Web application to a server. In one embodiment, for example, a computer-implemented includes identifying a function to-be-offloaded in a client-side scripting language file; generating an offloaded function based on the function to-be-offloaded; replacing, in the scripting language file, the body of the function to-be-offloaded with client RPC stub which, when executed by an end-user computing device as a result of a call to the function to-be-offloaded, causes one or more arguments passed into the function to-be-offloaded to be marshalled and sent to a server in one or more network messages.

24 Claims, 8 Drawing Sheets

300

OFFLOADING EXECUTION OF A PORTION OF A CLIENT-SIDE WEB APPLICATION TO A SERVER

PRIORITY CLAIM

This application claims the benefit of Provisional Appln. 61/788,889, entitled "OFFLOADING EXECUTION OF A PORTION OF A CLIENT-SIDE WEB APPLICATION TO A SERVER", filed Mar. 15, 2013, the entire contents of which is hereby incorporated by reference as if fully set forth herein, under 35 U.S.C. §119(e).

TECHNICAL FIELD

The present invention relates to Web applications and, more specifically, to a system and method for offloading execution of a portion of a client-side Web application to a server.

BACKGROUND

The first Web applications were largely server-based with little or no functionality implemented by client-side scripting. Transitions between application states were mainly accomplished with a request and response round-trip over a network between an end-user computing device and a server device. A Web browser executing on the end-user device would send, to the server device, a Hypertext Transfer Protocol (HTTP) request specifying a Web address (e.g., a URL) that identified the next user interface state (e.g., a new Web page). In response, the server device would send, back to the end-user device, a HTTP response including Hypertext Markup Language (HTML) content of the requested user interface state. The Web browser would then update a user interface (e.g., a Web page window) displayed at the end-user computing device based on the received HTML content.

Over time, with the increasing computing power of end-user computing devices and the wide availability of wired and wireless broadband Internet connections, more and more Web application functionality is now being executed by end-user devices. This shift in processing from server to client is facilitated by the ubiquity of Web browser software that supports Internet standards such Hypertext Markup Language (HTML), Cascading Style Sheets (CSS), Extensible Markup Language (XML), and other standards.

As more and more Web application functionality moves from server to client, a whole new set of challenges face developers of Web applications: functionality that was previously only executed by server devices is now being downloaded to and executed by end-user devices in the form of client-side scripting language instructions. Typically, the client-side scripting language is based on an edition of the European Computer Manufacturers Association (ECMA)-262 scripting language standard. The ECMA-262 standard is generally referred to in the industry as "Javascript". However, particular implementations of the ECMA-262 standard may be referred to by other names such a "Jscript", "ActionScript", "ECMAScript", etc. The portion of a Web application implemented in a client-side scripting language is referred to herein as a "client-side Web application". A client-side Web application typically is downloaded to and executed by end-user computing devices with the aid of Web browser software executing on the end-user computing devices. A client-side Web application executing on an end-user computing device may communicate over a data network, with the aid of the Web browser, with one or more servers that implement server-side Web application functionality such as, for example, accessing a back-end database.

A particular set of challenges facing developers of client-side Web applications involves implementing client-side Web application functionality that requires use of sensitive information that should not be downloaded to or stored at end-user devices. Such functionality includes, for example, accessing a third-party online service that requires a developer key or other information used by the third-party service to authenticate the developer. For various reasons, developers would prefer to keep such authentication information private to themselves and the third-party and not accessible to end-users of the client-side Web application. In addition to protecting sensitive information, there may be other reasons (e.g., performance) why developers would not want certain client-side Web application functionality executed by end-user devices. Consequently, a need arises for a technique that provides offloading execution of a portion of a client-side Web application to a server.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION

Figure 1:
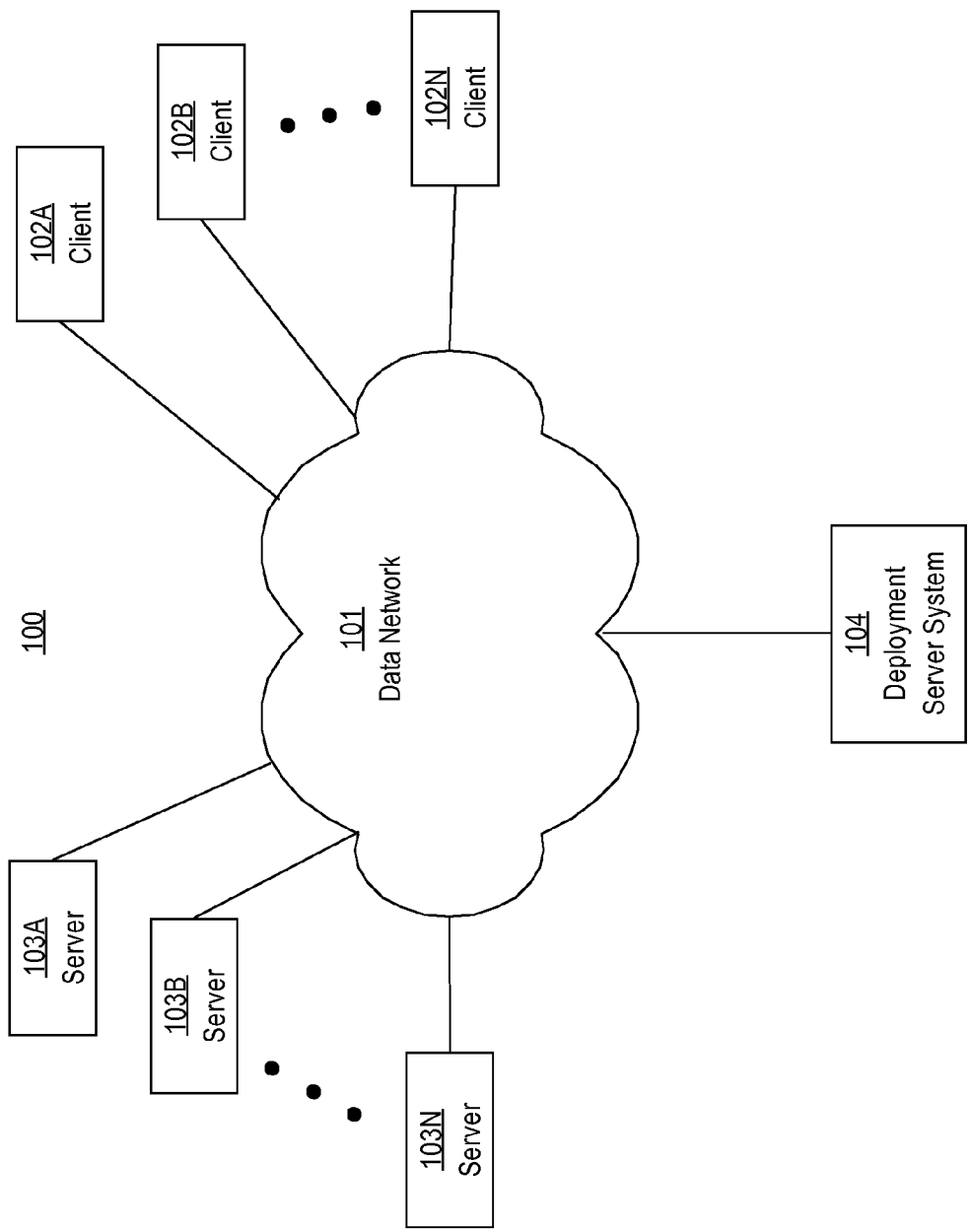
FIG. 1 is a block diagram of a network system incorporating a deployment server system, according to some embodiments of the invention.

A system and method for offloading a portion of a client-side Web application to a server is described. In the following description, for the purposes of explanation, numerous specific details are set forth in order to provide a thorough understanding of the present invention. It will apparent, however, to one skilled in the art that the present invention may be practiced without these specific details. In other instances, well-known structures and devices are show in block diagram form in order to avoid unnecessarily obscuring the present invention.

Overview

Techniques are provided which address the problems facing developers of Web applications associated with implementing Web application functionality with client-side scripting language instructions that contain sensitive information or that are otherwise not suited for execution by end-user computing devices, for example, because of performance or other reasons.

According to one aspect of the invention, a developer of a client-side Web application uploads or otherwise provides the client-side Web application to a client-side Web application deployment server system. The provided client-side Web application may include one or more client-side scripting language files. The client-side scripting language files may include one or more functions that the developer wishes to offload the execution of to the deployment server system. To do so, the developer may "tag" each of the functions to-be-offloaded in the client-side Web application provided to the deployment server system.

The deployment server system produces a modified client-side Web application from the developer-provided client-side Web application in which the source elements of the body of each function tagged by the developer as a function to-be-offloaded are replaced with a client-side remote procedure call (RPC) stub. The modified client-side Web application may be downloaded by end-user computing devices for execution from the deployment server system. The client-side RPC stub of the modified client-side Web application, when executed by an end-user computing device, marshalls any parameters passed into the function being called and sends them to the deployment server system as part of a remote procedure call.

When producing the modified client-side Web application from the developer-provided client-side Web application, the deployment server system also generates an offloaded function for each function tagged by the developer as a function to-be-offloaded, based on the source elements of the function that were replaced by the client-side RPC stub. Thus, each client-side RPC stub has a corresponding offloaded function that includes the source elements that were replaced by that client-side RPC stub. When the deployment server system receives a remote procedure call as a result of an end-user computing device executing a client-side RPC stub, the deployment server executes the corresponding offloaded function including the offloaded source elements. Any return or result values are marshalled by the deployment server and sent back to the end-user computing device.

Advantageously, with the approach of the present invention for offloading a portion of a client-side Web application to a server, the source elements of a function tagged by the developer as one to-be-offloaded are not delivered to the end-user computing devices as part of the modified client-side Web application produced by the deployment server system. Thus, any sensitive information of the source elements is not shared with or accessible to the users of the end-user computing devices, thereby protecting the sensitive information.

Further, the developer can develop the client-side Web application with minimal modifications to the developer's typical development procedure. In particular, the developer can author functions to-be-offloaded as if the source elements of the functions will be executed by end-user computing devices. In other words, the developer can author functions to-be-offloaded and functions that are not to-be-offloaded in the same way. Responsibility for offloading the source elements is handled by the deployment server system and the developer can simply tag which functions of the developer-provided client-side Web application should be offloaded before providing the client-side Web application to the deployment server system.

With this overview in mind, further details and embodiments of the present invention can be understood with reference to the drawings and the following description.

Deployment Server Network System

A block diagram of a network system 100 in which some embodiments of the present invention may be implemented is shown in FIG. 1. Network system 100 includes a data network 101. The data network 101 provides communicative interconnection of a plurality of computer systems, such as client computer systems 102A-102N and server computer systems 103A-103N. The network system 100 may include more or less client computer systems 102 and more or less server computer systems 103 than is shown in FIG. 1.

Data network 101 may include one or more wired and/or one or more wireless sub-networks. The transmission media in a wireless network is typically electromagnetic radiation, such as radio waves or light waves. A wireless network may include one or more local area networks (LANs), one or more wide area networks (WANs), or both LANs and WANs. The transmission media in a wired network is a wire, such as copper wire, or the equivalent of wire, such as fiber optic cable. A wired network may include one or more local area networks (LANs), one or more wide area networks (WANs), or both LANs and WANs. One or more sub-networks may be included in data network 101 and may include both public networks, such as the Internet, and private networks and may utilize any networking technology and protocol, such as Transmission Control Protocol/Internet Protocol (TCP/IP), for example.

The client computer systems 102A-102N may include any type of electronic data processing system or communication device. Examples of an electronic data processing system include personal computer systems, such as desktop computers or laptop computers, workstation computer systems, server computer systems, networks of computer systems, personal digital assistants (PDAs), wireless communications devices, such as cellular telephones, portable personal computing devices, such as smart phones or tablet computers, etc. The client computer systems 102A-102N may connect directly to the data network 101, or may connect indirectly to the network 101 through one or more other networks, gateways, firewalls, etc. Likewise, the connection to the network 101 may be wired, wireless, or a combination of wired and wireless. Typically, the user interface of the client computer systems 102A-102N is a graphical user interface, but other interfaces may be used as well.

The deployment server system 104 is also communicatively connected to the data network 101. The deployment server system 104 interfaces with the data network 101 and with multiple servers and/or clients that are connected to the data network 101 and provides web application deployment services to those servers and/or clients. The deployment services provided by deployment server system 104 include offloading execution of a portion of a client-side Web application to the deployment server system 104.

Deployment Server System

Figure 2:
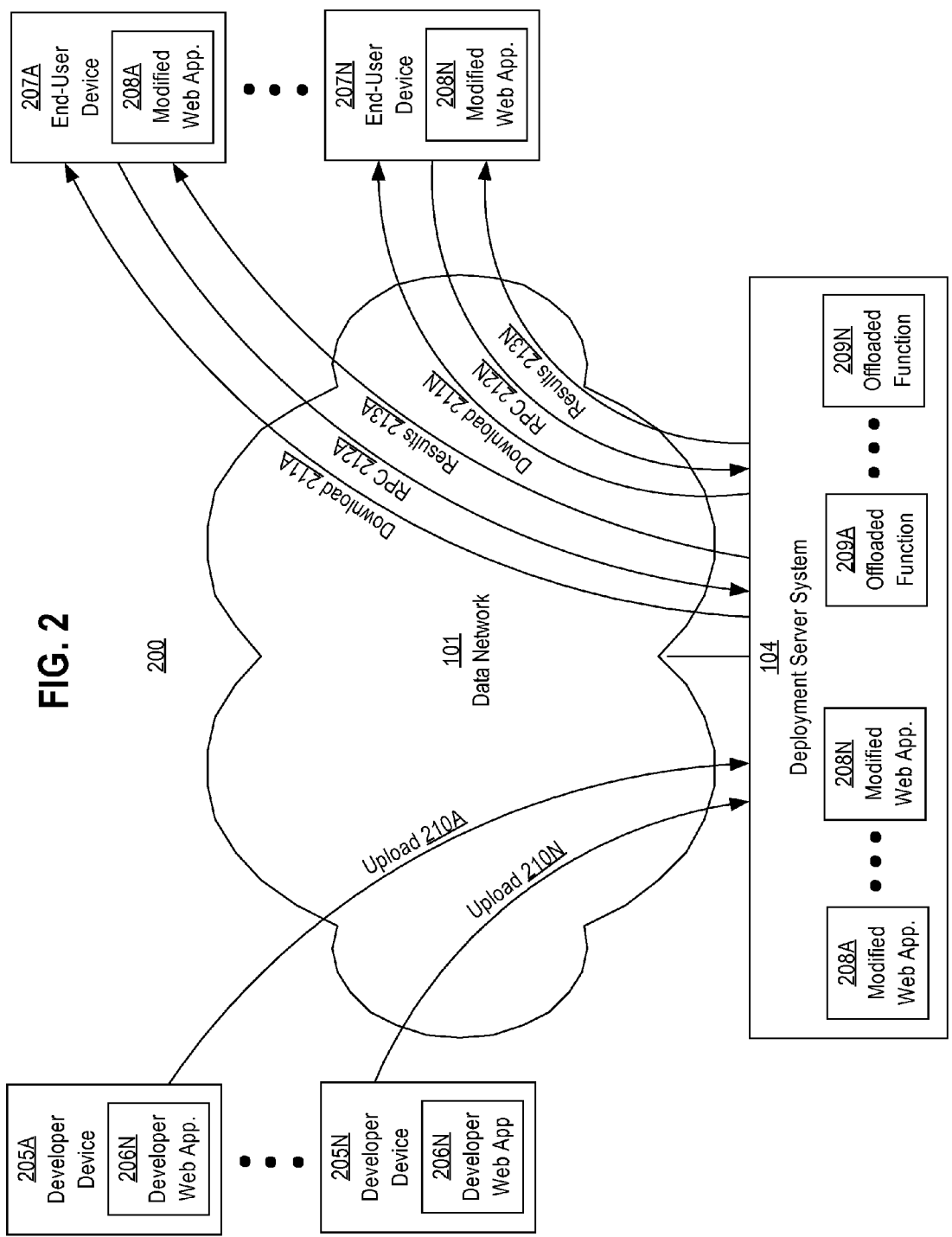
FIG. 2 is a block diagram of a network system incorporating a deployment server system, according to some embodiments of the present invention.

A block diagram of a network system 200 incorporating the deployment server system 104 of FIG. 1, according to some embodiments of the present invention, is shown in FIG. 2. The system 200 includes the data network 101, the deployment server system 104, a plurality of developer devices 205A-205N used by developers of developer client-side Web applications 206A-206N, and a plurality of end-user devices 207A-207N used by end-users of modified client-side Web applications 208A-208N.

The developer devices 205A-205N and the end-user devices 207A-207N may include both client and server systems shown in FIG. 1. The deployment server system 104 uses the data network 101 to communicate with the developer devices 205A-205N and the end-user devices 207A-207N. The network system 200 may include more or less developer devices and more or less end-user devices than is shown in FIG. 2.

The developers upload 210 the developer client-side Web applications 206A-206N over data network 101 from the developer devices 205A-205N to the deployment server system 104. The deployment server system 104 produces the modified client-side Web applications 208A-208N and offloaded functions 209A-209N from the uploaded developer client-side Web applications 206A-206N.

The end-user devices 207A-207N download 211A-211N the modified client-side Web applications 208A-208N from the deployment server system 104. The end-user devices 207A-207N also execute the modified client-side Web applications 208A-208N. When executing the modified client-side Web applications 208A-208N, the end-user devices 207A-207N may make remote procedure calls 212A-212N to the deployment server system 104 over the data network 101. In response to receiving the remote procedure calls 212A-212N from the end-user devices 207A-207N, the deployment server system 104 execute offloaded functions 209A-209N. The deployment server system 104 returns 213A-213N, over the data network 101, any results of executing the offloaded functions 209A-209N to the end-user devices 207A-207N.

In a variation, the modified client-side Web applications 208A-208N produced by the deployment server system 104 are downloaded 211A-211N by the end-user devices 207A-207N from another server system (not shown). For example, the end-user devices 207A-207N may download 211A-211N the modified client-side Web applications 208A-208N from third-party content delivery network servers. Thus, it should be understood that end-user devices 207A-207N are not required to download 211A-211N the modified client-side Web applications 208A-208N from the deployment server system 104.

Figure 8:
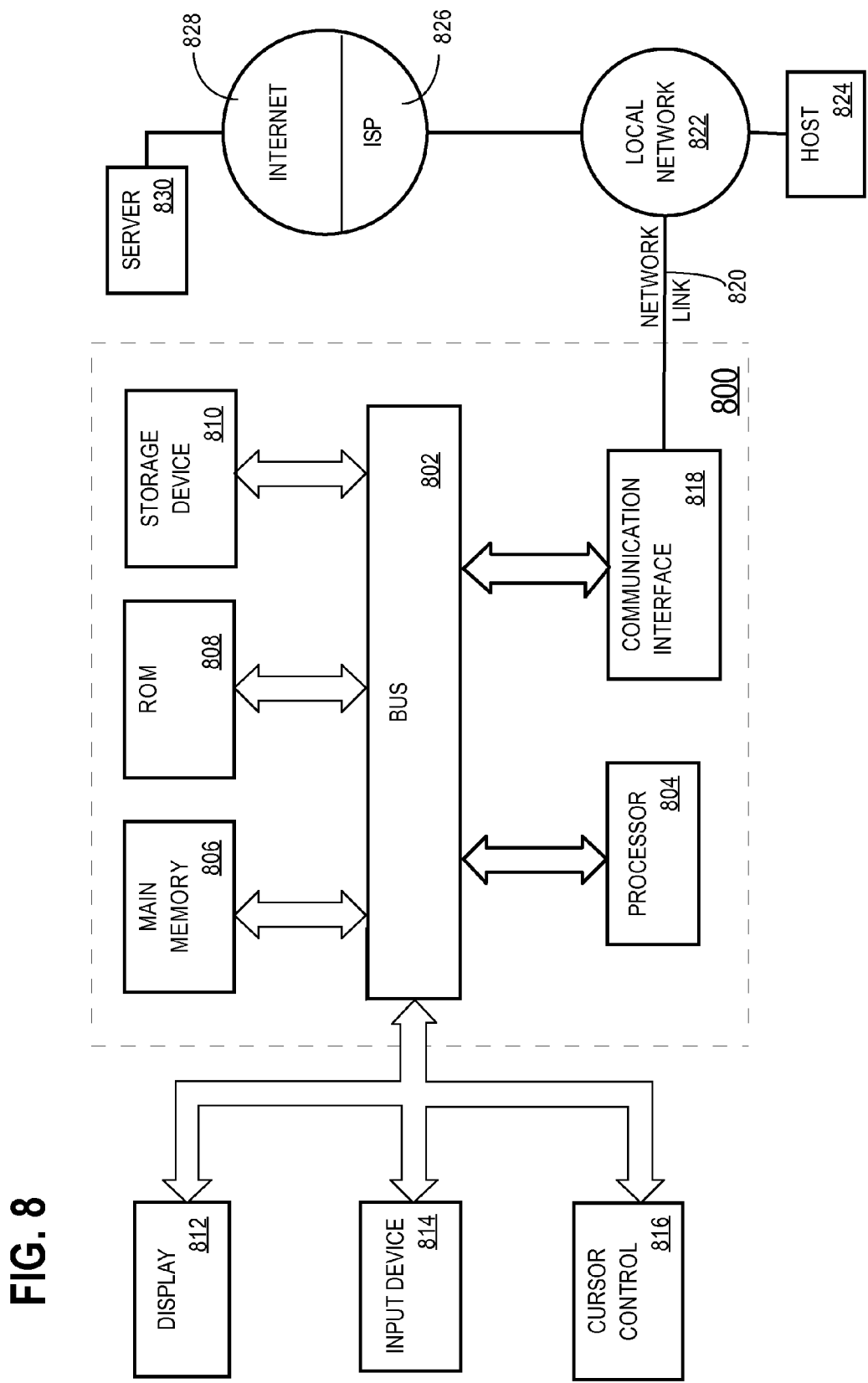
FIG. 8 is a block diagram a computer system on which some embodiments of the present invention may be implemented.

The deployment server system 104 may be implemented by one or more computer systems such as one or more computer systems 800 of FIG. 8. The one or more computer systems may be housed in one or more data centers or other hosting facilities. Functionality provided by the deployment server 104 may be distributed, replicated, and/or partitioned, according to the requirements of the implementation at hand. For example, one or more computer systems of the deployment server system 104 may be dedicated to receiving developer client-side Web applications 206A-206N from developer devices 205A-205N and producing modified client-side Web applications 208A-208N and offloaded functions 209A-209N, and another set or sets of one or more computer systems may be dedicated to handling remote procedure calls from end-user devices 207A-207N and executing offloaded functions 209A-209N.

Example Deployment Server System Implementation

Figure 3:
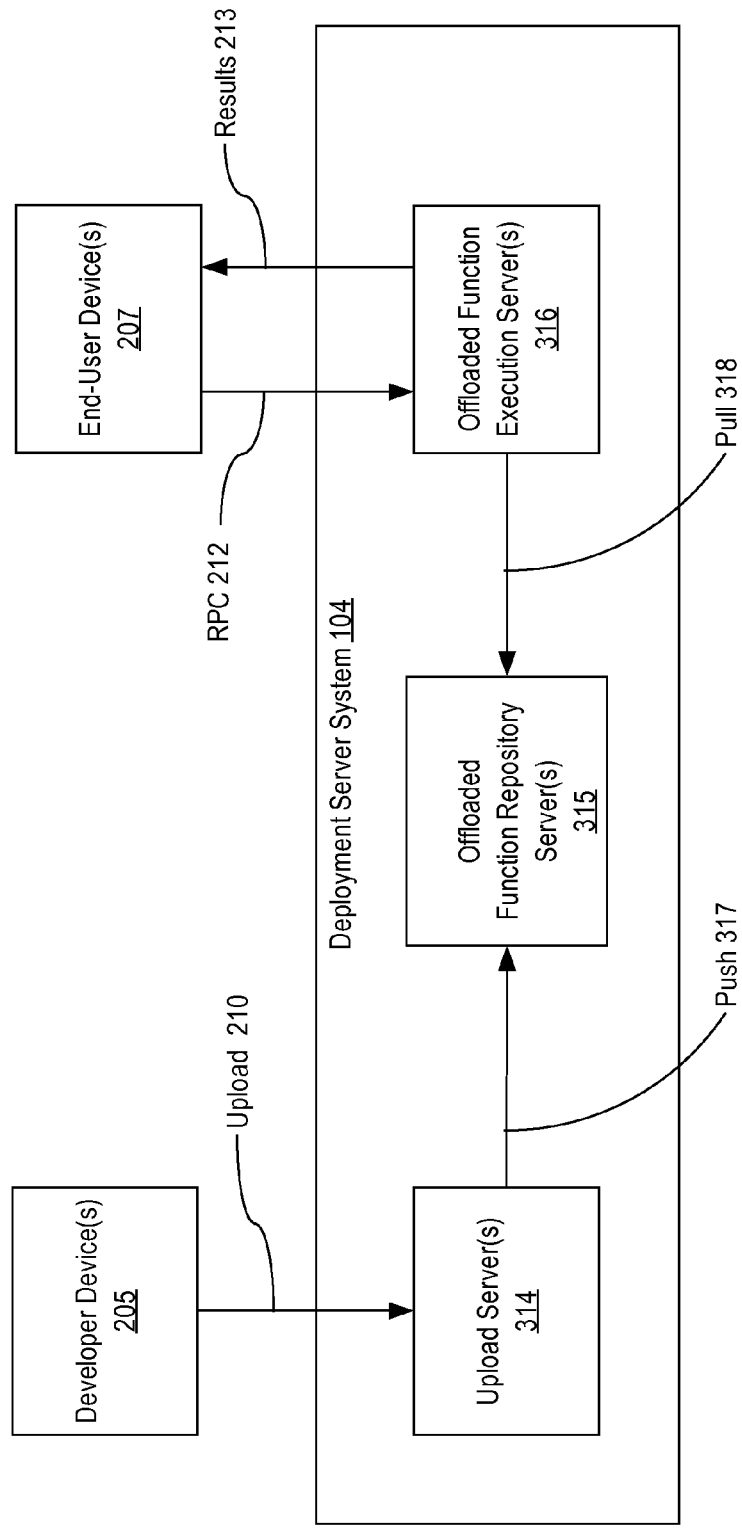
FIG. 3 is a block diagram of a network system incorporating a deployment server system, according to some embodiments of the present invention.

For example, FIG. 3 is a block diagram of a network system 300 incorporating the deployment server system 104 of FIG. 1, according to some embodiments of the invention. Here, the deployment server system 104 includes one or more upload servers 314, one or more offloaded function repository servers 315, and one or more offloaded function execution servers 316.

With the deployment server system implementation of FIG. 3, the offloaded function execution servers 316 may be deployed at locations that are in geographic proximity to the end-user devices 207. A remote procedure call 212 from an end-user device 207 may be algorithmically routed to an offloaded function execution server 316 that is best suited to handle the remote procedure call. Which offloaded function execution server 316 is considered to be the best suited one may depend on a variety of factors but, in general, may be based on some estimated cost for the offloaded function execution server 316 to receive and handle the remote procedure call 212 including, for example, executing the corresponding offloaded function 209 and returning 213 any results to the calling end-user device 207. Such costs may take into account, as examples, network costs (e.g., network latency between the end-user device 207 and the offloaded function execution server 312, number of network hops between the end-user device 207 and the offloaded function execution server 312, etc.) and server load costs (e.g., a number of offloaded functions 209 that the offloaded function execution server 312 is currently executing, etc.). Significantly, with the deployment server system implementation of FIG. 3, the offloaded function execution servers 316 receiving remote procedure calls 212 can pull 318 offloaded functions 209 from the offloaded function repository servers 315 as and when needed, in response to receiving the remote procedure calls 212.

The developer devices 205 may be connected to the upload servers 314 through the data network 101. Similarly, end-user devices 207 may be connected to offloaded function execution servers 316 through the data network 101. The upload servers 314 may be connected to the offloaded function repository servers 315 through the data network 101 or another data network. The offloaded function execution servers 316 may be connected to the offloaded function repository servers 315 through the data network 101 or another data network.

The developer devices 205 upload 210 the developer client-side Web applications 206 to the upload servers 314. The upload servers 314 produce the modified client-side Web applications 208 and the offloaded functions 209. In addition, the upload servers 314 push 317 the offloaded functions 209 to the offloaded function repository servers 315. The offloaded function repository servers 315 store the offloaded functions 209 that are pushed 314 to them by the upload servers 314.

The offloaded function execution servers 316 receive remote procedure calls 212 from the end-user devices 207. In response to receiving the remote procedure calls 212, the offloaded function execution servers 316 consult a storage cache local to the offloaded function execution servers 316 for offloaded functions 209 to execute. If a particular offloaded function 209 to execute is not present in the local storage cache, the offloaded function execution servers 316 retrieve (pull) 318 the missing offloaded function 209 from the offloaded function repository servers 315. Once retrieved, the offloaded function 209 is stored in the local storage cache for subsequent remote procedure calls 212 invoking the offloaded function 209 so that the offloaded function execution servers 316 do not need to pull 318 the offloaded function 209 from the offloaded function repository servers 315 for the subsequent remote procedure calls 212. Once pulled 318 from offloaded function repository servers 315, the retrieved offloaded function 209 is then executed by the offloaded function execution servers 316 and any results are returned 213 to the end-user device 207 that made the remote procedure call 212.

The deployment server system implementation of FIG. 3 is just one possible implementation of the deployment server system 104. Other implementations are possible and the present invention is not limited to the implementation depicted in FIG. 3 described above.

Developer Client-Side Web Application

Figure 4:
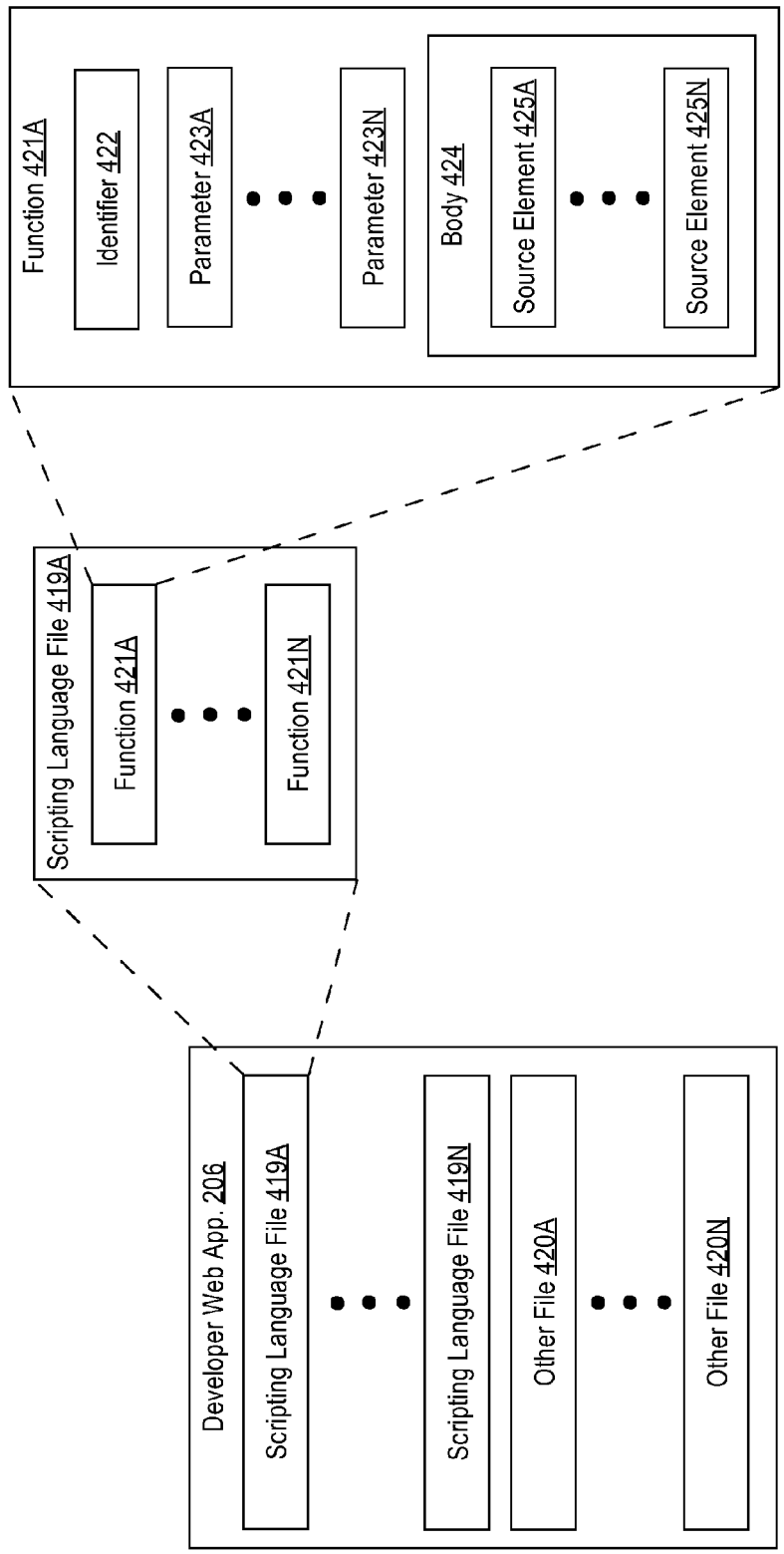
FIG. 4 is a block diagram of a developer client-side Web application, according to some embodiments of the present invention.

FIG. 4 is a block diagram of a developer client-side Web application 206 that may be uploaded to the deployment server system 104, according to some embodiments of the invention. The Web application 206 includes one or more client-side scripting language files 419A-419N and possibly one or more other files 420A-420N. A client-side scripting language file 419 is a file that contains client-side scripting language instructions. Typically, the scripting language instructions are based on an edition of the European Computer Manufacturers Association (ECMA)-262 scripting language standard. The ECMA-262 standard is generally referred to in the industry as "Javascript". However, particular commercial implementations of the ECMA-262 standard may be referred to by other names such a "Jscript", "ActionScript", "ECMAScript", etc. It should be understood that the present invention is not limited to any particular edition or any particular implementation of the ECMA-262 standard. Any edition or implementation, currently existing or developed in the future, capable of supporting the techniques described herein for offloading execution of a portion of a client-side Web application to a server may be used.

A client-side scripting language file 419 may contain just client-side scripting language instructions and associated information (e.g., client-side scripting language comments and/or metadata). Alternatively, a client-side scripting language file 419 may contain other information in addition to client-side scripting language instructions and related information. Such other information may include, for example, HyperText Markup Language ("HTML"), eXtensible HyperText Markup Language ("XHTML"), eXtensible Markup Language ("XML"), and/or Cascading Style Sheet ("CSS") formatted information and/or other information for carrying out and/or supporting client-side Web application functionality at end-user devices 207.

In addition to client-side scripting language files 419A-419N containing client-side scripting language instructions and associated information, other files 420A-420N that do not contain client-side scripting language instructions, but that facilitate execution of the client-side scripting language instructions by the end-user devices 207A-207N, may also be contained in the developer client-side Web application 206. The other files 420A-420N may contain, for example, HTML, XHTML, XML, and/or CSS formatted information and/or other information for carrying out and/or supporting client-side Web application functionality at end-user devices 207A-207N.

The developer client-side Web application 206 may be uploaded 210 to the deployment server system 104 in a variety of different formats. In one possible format, the developer client-side Web application 206 is a compressed file archive. For example, the Web application 206 may be compressed as a ZIP file, a tarball, or the like. In another possible format, the files 419A-419N and 420A-420N of the developer client-side Web application 206 are uploaded 210 individually to the deployment server system 104. In one scenario, a Uniform Resource Locator (URL) or other network location address of the developer client-side Web application 206 is uploaded 210 to deployment server system 104 and deployment server system 104 uses to URL or network location address to download the developer client-side Web application 206 from a network location (e.g., from a Web server).

A scripting language file 419 may define one or more functions 421A-421N. The definition of a function 421 in a scripting language file 419 adheres to a known scripting language syntax. Typically, the definition includes the use of a scripting language keyword such as "function". The definition may optionally specify a function identifier 422 and optionally one or more parameters 4243A-423N. The definition includes a body 424 that optionally contains one or more source elements 425A-425N. An example of a definition of a function 421 that may be found in a client-side scripting language file 419 is: function add (a, b) {return a+b};

In this example, the name of the function is "add". The function "add" accepts two parameters "a" and "b". The body of the function contains one source element which, when executed, returns the result of applying the predefined "+" operator to the argument passed into the function for the "a" parameter and the argument passed into the function for the "b" parameter.

According to some embodiments of the present invention, prior to uploading a developer client-side Web application 206 to the deployment server system 104, the developer may "tag" one or more functions 421 in the client-side scripting language files 419 of the developer client-side Web application 206 as "functions to-be-offloaded." In this description, a "tag" is data understood by the deployment server system 104 to designate a function declaration in a client-side scripting language file as a function to-be-offloaded. There are a number of different possible ways in which a developer can tag a function 421 as one to-be-offloaded.

A function 421 in a client-side scripting language file 419 may be tagged by the developer in a variety of different ways. In one way, the developer tags a function 421 in a client-side scripting language file 419 using a manifest file that is uploaded to the deployment server system 104 as part of a developer client-side Web application 206. This kind of tag is referred to herein as a "manifest tag" because the tag is included in a designated manifest file. The manifest file includes a manifest tag for each function 421 declared in the client-side scripting language files 419A-419N of the developer client-side Web application 206 that is to-be-offloaded. The manifest tag may include the function's identifier 422 or other information that may be used by the deployment server system 104 to identify the function 421 to-be-offloaded. To identify a function 421 based on a manifest tag, the deployment server system 104 may syntactically and semantically analyze (i.e., parse) the client-side scripting language files 419A-419N according to a predefined scripting language grammar. For example, for a given identifier of a function in the manifest file, the deployment server system 104 may parse the scripting language files 419A-419N for a definition of a function 421 having an identifier 422 that matches or otherwise satisfies the identifier of the manifest tag.

In another way to declare a function 421 in a scripting language file 419 as one to-be-offloaded, the function 421 is authored by the developer to include a tag that adheres to a predetermined syntax (e.g., a predetermined keyword or set of keywords). This kind of tag is referred to herein an "embedded tag" because the tag is embedded in a client-side scripting language file 419. More specifically, the tag is embedded in the definition of the function 421 that is to-be-offloaded.

An embedded tag is not limited to any particular syntax. However, preferably, the syntax should not interfere with regular operations of other processors of the scripting language files 419A-419N that do not understand the syntax. In one embodiment, an embedded tag is encoded in a client-side scripting language comment added to the body 424 of the function 421 that is to-be-offloaded. By being encoded in a client-side scripting language comment, the embedded tag will not interfere with regular operations of other client-side scripting language processors that do not understand the special syntax. This is because the embedded tag will be treated by these other processors as simply a client-side scripting language comment. Other manners of tagging a function 421 in a scripting language file 419 as one to-be-offloaded may be used and the present invention is not limited to the two ways just discussed.

Modified Client-Side Web Application

Figure 5:
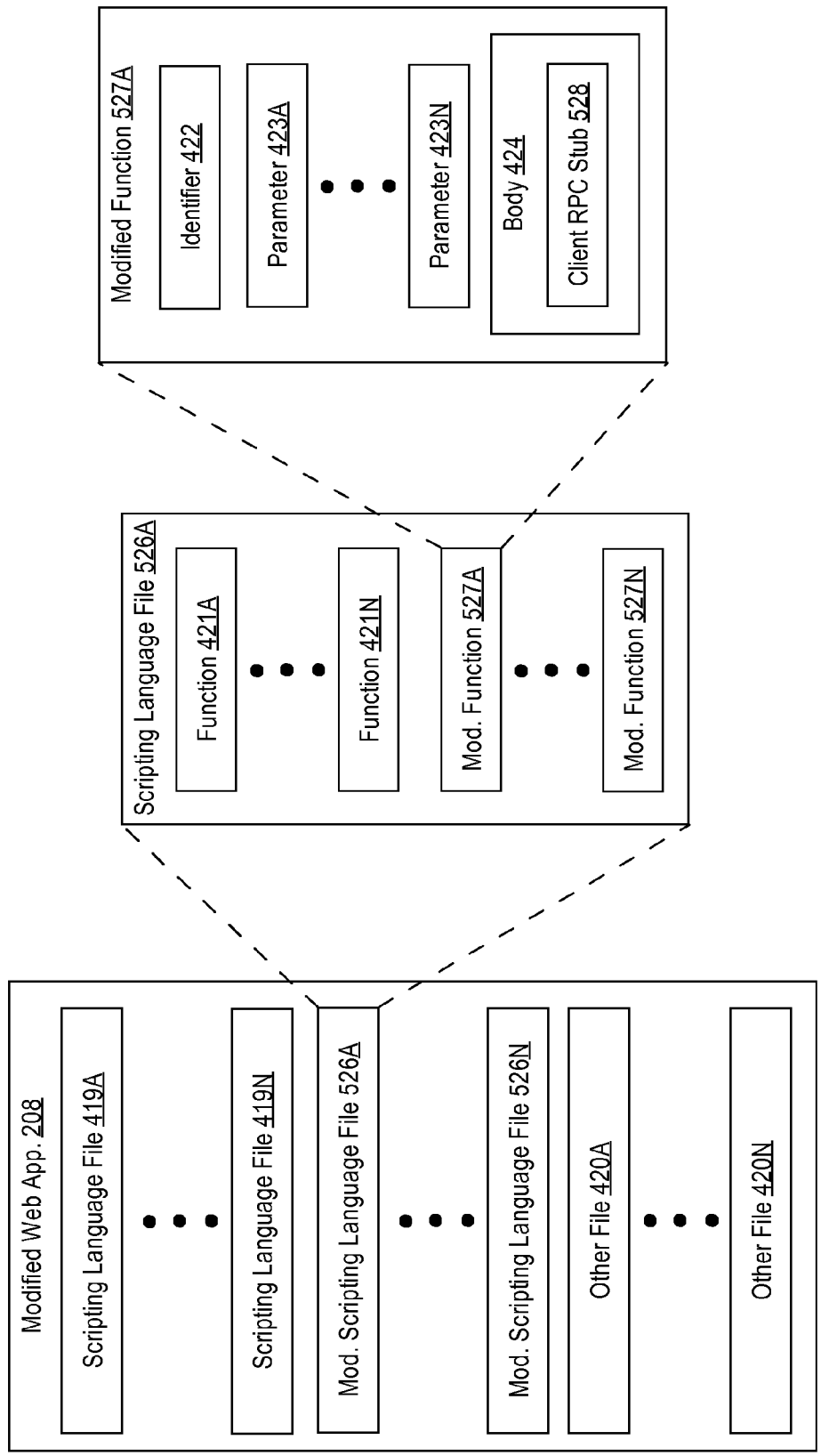
FIG. 5 is a block diagram of a modified client-side Web application, according to some embodiments of the present invention.

FIG. 5 is a block diagram of a modified client-side Web application 208 produced by the deployment server system 104 from an uploaded developer client-side Web application 206, according to some embodiments of the invention. The modified Web application 208 may contain zero or more unmodified scripting language files 419A-419N and any other files 420A-420N of the developer client-side Web application 206 from which the modified Web application 208 is produced. However, the modified Web application 208 may also contain one or more modified scripting language files 526A-526N generated by modifying scripting language files of the developer client-side Web application 206. In particular, a scripting language file of the developer client-side Web application 206 may be modified to include zero or more unmodified functions 421 and one or more modified functions 527. A modified function 527 may be generated from a function 421 of the scripting language file of the developer client-side Web application 206 and includes the identifier 422, the parameters 423A-423N, and the body of the 424 of the function 421 of the scripting language file of the developer client-side Web application 206 in which the source elements 425A-425N of the function are replaced by a client RPC stub 528.

According to some embodiments of the invention, after receiving an uploaded developer client-side Web application 206, the deployment server system 104 syntactically and semantically analyzes (parses) the client-side scripting language files 419A-419N of the uploaded developer client-side Web application 206 to identify any functions 421 tagged by the developer as functions-to-be-offloaded. Such identification may be based, for example, on manifest tags, embedded tags, or a combination of manifest tags and embedded tags, or any other suitable tagging method. For each function to-be-offloaded, the deployment server system 104 replaces, in the client-side scripting language file 419 in which the function 421 is defined, the source elements 425A-425N of the function body 424 with a set of client-side scripting language instructions 528. The set of client-side scripting language instructions that replaces the source elements 425A-425N of the function body 424 is referred to herein as a client-side remote procedure call (RPC) stub. The deployment server system 104 does this for each tagged function 421 to-be-offloaded thereby producing the modified scripting language files 526A-526N containing modified functions 527A-527N of the modified Web application 208.

The modified Web application 208 produced by the deployment server system 104 from a given developer Web application 206 may be produced as a compressed file archive such as a ZIP file or the like. Alternatively, the modified Web application 208 may be produced as a collection of individual files that includes zero or more unmodified scripting language files 419A-419N, one or more modified scripting language files 526A-526N, and zero or more other files 420A-420N.

In one embodiment, the deployment server system 104 produces a single scripting language file from the zero or more unmodified scripting language files 419A-419N and the one or more modified scripting language files 526A-526N according to a minification technique such as the one described in related U.S. patent application Ser. No. 13/315,918, "Techniques and Mechanisms for Web Application Minification", filed Dec. 9, 2011, the entire contents of which is hereby incorporated by reference as if fully set forth herein. In this case, the produced modified Web application 208 includes the single scripting language file but does not include the zero or more unmodified scripting language files 419A-419N or the one or more modified scripting language files 526A-526N.

Offloaded Function

Figure 6:
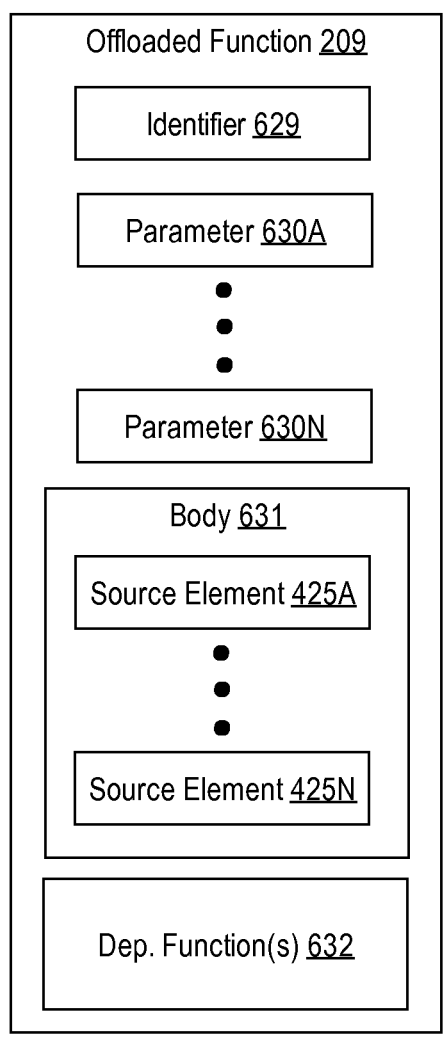
FIG. 6 is a block diagram of an offloaded function, according to some embodiments of the present invention.

FIG. 6 is a block diagram of an offloaded function 209, according to some embodiments of the present invention. For a given developer Web application 206 designating one or more functions 421 to-be-offloaded, the deployment server system 104 produces a corresponding offloaded function 209 for each function 421 of the developer Web application 206 to-be-offloaded. The corresponding offloaded function 209 has an identifier 629, zero or more parameters 630A-630N corresponding to the parameters 432A-423N of the corresponding function 421 to-be-offloaded, a body 631, the source elements 425A-425N of the corresponding function 421 to-be-offloaded that are replaced in the corresponding function 421 to-be-offloaded with the client RPC stub 528, and possibly other functions(s) scripting language files 419A-419N of the developer Web application 206 that the source elements 425A-425N of the corresponding function 421 to-be-offloaded depend on.

The definition of an offloaded function 209 may be stored in a file or a database as a set of client-side scripting language instructions. The set of client-side scripting language instructions can be compiled into an intermediate executable format (e.g., bytecode) and the intermediate executable format stored in the file or database instead of the client-sides scripting language instructions. Compiling the set of client-side scripting language instructions into an intermediate executable format such as, for example, bytecode can improve execution performance of the offloaded function 209 when executed by the deployment server system 104 in response to an RPC 212 from an end-user device 207.

The dependent functions 632 that the source elements 425A-425N depend on may be determined by the deployment server system 104 when parsing the scripting language files 419A-419N of the developer Web application 206. In particular, the deployment server system 104 can construct a directed graph in which the nodes of the graph represent functions defined in the scripting language files 419A-419N of the developer Web application 206 and a directed edge from one node to another node in the graph represents a function (the "caller function") that calls another function (the "callee function"). For a given function 421 to-be-offloaded defined in a scripting language file 419 of the developer Web application 206, any functions that the given function calls will be represented as a node in the graph representing the given function and directed edges to nodes representing the functions that the given function calls. The nodes representing the functions that the given function calls may, in turn, each have directed edges to nodes representing the functions that function calls, and so on. The set of functions that the given functions depends on can be identified by traversing the directed graph starting at the node representing the give function in a depth-first or breadth-first manner. Cycles in the graph can be detected by keeping track of which nodes have already been visited during the traversal. When a node, other than the given node, is first encountered during the traversal, the definition of the function 421 corresponding to the visited node may be written to a file or database as part 632 of the offloaded function 209 so that the function 421 is available when executing the offloaded function 209.

In some embodiments, not all functions 421 that a given function 421 to-be-offloaded has a direct or indirect dependency on are included in the dependent functions 632 of the offloaded function. In particular, functions 421 of the scripting language files 419 of the developer Web application 206 that are part of a standard or shared library of functions may be omitted from the dependent function 632. In this case, the deployment server system 104 may make the standard or shared library functions available to the offloaded function 209 when the offloaded function 209 is executed by the deployment server system 104.

RPC Process

Figure 7:
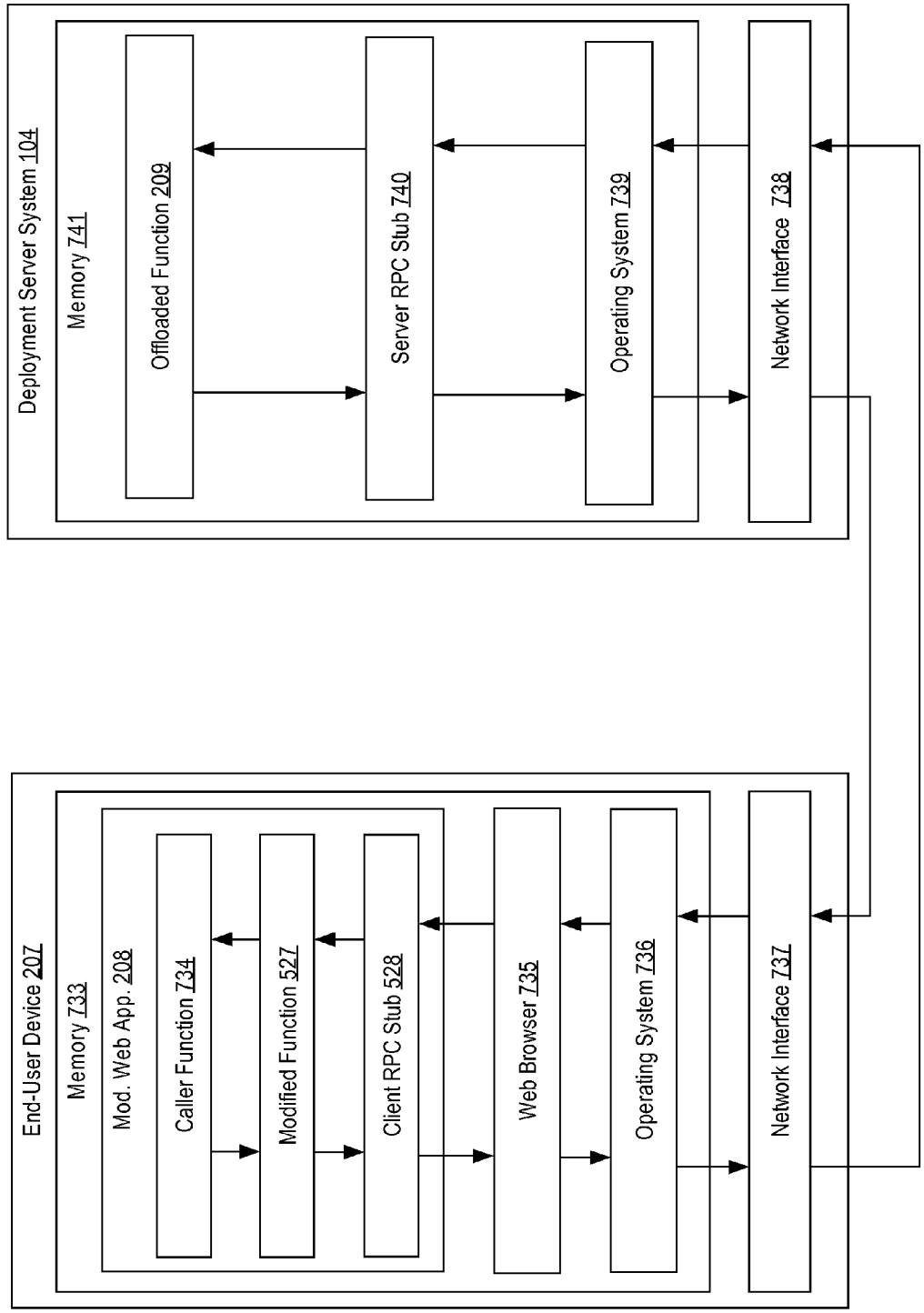
FIG. 7 is a block diagram of a remote procedure call process, according to some embodiments of the present invention.

FIG. 7 is a block diagram of a remote procedure call process 700, according to some embodiments of the present invention. The process 700 occurs in the context of an end-user device 207 executing a modified Web application 208 generated by the deployment server system 104, a web browser 735, and an operating system 736, all stored in a memory 733 of the end-user device 207. The process 700 also occurs in the context of the deployment server system 104 executing an offloaded function 209 corresponding to a modified function 527 of the modified Web application 208 executing on the end-user device 207. The offloaded function 209 also corresponds to a client RPC stub of the modified Web application 208 executing on the end-user device 207. The deployment server system 104 stores the offloaded function 209, a server remote procedure call stub 740, and an operating system 730 in a memory 741 of the deployment server system 104. The end-user device 207 and the deployment server system 104 each have a network interface, 737 and 738 respectively, for communicating with each over a packet-switched data network such as, for example, the Internet.

The process 700 begins when a caller function 734 of the modified Web application 208 calls the modified function 527. The call may pass one or more arguments for one or more parameters 423A-423N of the modified function 527. Calling the modified function 527 causes the client RPC stub 528 to be executed. The client RPC stub 528 marshalls any arguments passed into the modified function 527 by the caller function 734. Marshalling includes packaging the arguments into a data structure suitable for transport over a data network. According to one embodiment, the client RPC stub 528 marshalls any arguments into a Javascript Object Notation (JSON) format (e.g., as defined in Request for Comments (RFC) document 4627). However, other data formats may be used such as an eXtensible Markup Language (XML) format, as just one example.

The client RPC stub 528 invokes network transport services provided by the web browser 735 to send any marshalled arguments in a remote procedure call to the deployment server system 104. In addition to the marshalled arguments, the remote procedure call may include an identifier of the offloaded function 209 to be called. The identifier may be assigned by the deployment server system 104 when generating the modified function 527 based on a corresponding function 421 to-be-offloaded in the developer Web application 206 on which the modified Web application 208 is based. The identifier may then be included in the definition of the modified function 527 in the modified Web application 208 such that the identifier is available to the client RPC stub 528 when the modified function 527 is called. The web browser 735 may use network transport services provided by the operating system 736 which, in turn, sends network packets to the deployment server system 104 through the network interface 737. The network packets may be based on any number of networking protocols such as the Hyper Text Transfer Protocol (HTTP), the Transmission Control Protocol (TCP), the Internet Protocol (IP), and others. Among other possible information, the network packets contain the identifier of the offloaded function 209 and any arguments marshalled by the client RPC stub 528.

The network packets are received at the network interface 738 of the deployment server system 104 which passes the network packets to the operating system 739 which, in turn, passes information in the network packets to the server remote procedure stub 740. The server remote procedure call stub 740 unmarshalls any arguments sent in the remote procedure call from the end-user device 207. In addition, the server remote procedure call stub 740 determines which offloaded function 209 to call based on the identifier in the remote procedure call from the end-user device 207.

Once the server RPC stub 740 has determined the offloaded function 209 to call, the server RPC stub 740 calls (executes) the offloaded function 209, passing any unmarshalled arguments for the parameters 630A-630N of the offloaded function 209, if any.

Results of execution of the offloaded function 209 are returned to the server RPC stub 740. Such results may include any return value from the offloaded function 209 and any arguments passed into the offloaded function 209 that were modified by the execution of the offloaded function 209. The server RPC stub marshalls the results and send the results in one or more network packets back to the end-user device 207 with the aid of the operating system 739 and the network interface 738.

Results received at the network interface 737 of the end-user device 207 are provided to the client RPC stub 528 through the operating system 736 and the web browser 735. The client RPC stub 528 unmarshalls the results and uses the unmarshalled results to set the values of arguments passed into the modified function 527 by the caller function 734 that were modified by the execution of the offloaded function 209. In addition, any return value of the offloaded function 209 is returned by the modified function 527 to the caller function 734.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for offloading execution of a portion of a client-side Web application to a server, the method comprising:
receiving a client-side scripting language file;
identifying a function to-be-offloaded in the client-side scripting language file;
wherein the function to-be-offloaded has a function body and a list of one or more parameters;
generating an offloaded function based on the function to-be-offloaded;
replacing, in the scripting language file, the function body of the function to-be-offloaded with a set of client-side scripting language instructions which, when executed by an end-user computing device as a result of a call to the function to-be-offloaded, cause one or more arguments, corresponding to the one or more parameters passed into the function to-be-offloaded by the call to the function, to be marshalled and sent to a server in one or more first network messages.

2. The method of claim 1, further comprising:
in response to receiving, at the server, the one or more first network messages, invoking the offloaded function, and marshaling and sending results of invoking the offloaded function to the end-user computing device in one or more second network messages.

3. The method of claim 1, further comprising: prior to receiving the first network messages, serving the scripting language file, with the function body replaced with the set of client-side scripting language instructions, to the end-user computing device.

4. The method of claim 1, wherein receiving the client-side scripting language file includes receiving a compressed file archive containing the client-side scripting language file.

5. The method of claim 1, wherein identifying the function to-be-offloaded in the client-side scripting language file includes parsing the function body for a client-side scripting language comment containing a predetermine keyword or a predetermined set of keywords.

6. The method of claim 1, wherein identifying the function to-be-offloaded includes reading a manifest identifying the function by name, and parsing the client-side scripting language for a function with the name.

7. The method of claim 1, further comprising storing the offloaded function in an offloaded function repository.

8. The method of claim 1, further comprising: receiving one or more client-side scripting language files that are part of an overall Web application; wherein generating the offloaded function includes identifying one or more other functions in the one or more client-side scripting language files on which the function to-be-offloaded depends; and generating the offloaded function based on the function to-be-offloaded and the one or more other functions on which the function to-be-offloaded depends.

9. One or more non-transitory computer-readable media storing instructions which, when executed by one or more computing devices, cause performance of a method for offloading execution of a portion of a client-side Web application to a server, the method comprising:
receiving a client-side scripting language file;
identifying a function to-be-offloaded in the client-side scripting language file;
wherein the function to-be-offloaded has a function body and a list of one or more parameters;
generating an offloaded function based on the function to-be-offloaded;
replacing, in the scripting language file, the function body of the function to-be-offloaded with a set of client-side scripting language instructions which, when executed by an end-user computing device as a result of a call to the function to-be-offloaded, cause one or more arguments, corresponding to the one or more parameters passed into the function to-be-offloaded by the call to the function, to be marshalled and sent to a server in one or more first network messages.

10. The one or more non-transitory computer-readable media of claim 9, the method further comprising:
in response to receiving, at the server, the one or more first network messages, invoking the offloaded function, and marshaling and sending results of invoking the offloaded function to the end-user computing device in one or more second network messages.

11. The one or more non-transitory computer-readable media of claim 9, the method further comprising: prior to receiving the first network messages, serving the scripting language file, with the function body replaced with the set of client-side scripting language instructions, to the end-user computing device.

12. The one or more non-transitory computer-readable media of claim 9, wherein receiving the client-side scripting language file includes receiving a compressed file archive containing the client-side scripting language file.

13. The one or more non-transitory computer-readable media of claim 9, wherein identifying the function to-be-offloaded in the client-side scripting language file includes parsing the function body for a client-side scripting language comment containing a predetermine keyword or a predetermined set of keywords.

14. The one or more non-transitory computer-readable media of claim 9, wherein identifying the function to-be-offloaded includes reading a manifest identifying the function by name, and parsing the client-side scripting language for a function with the name.

15. The one or more non-transitory computer-readable media of claim 9, the method further comprising storing the offloaded function in an offloaded function repository.

16. The one or more non-transitory computer-readable media of claim 9, the method further comprising: receiving one or more client-side scripting language files that are part of an overall Web application; wherein generating the offloaded function includes identifying one or more other functions in the one or more client-side scripting language files on which the function to-be-offloaded depends; and generating the offloaded function based on the function to-be-offloaded and the one or more other functions on which the function to-be-offloaded depends.

17. A system comprising:
one or more processors;
one or more non-transitory computer readable media storing instructions which, when executed by the one or more processors, causes performance of a method for offloading execution of a portion of a client-side Web application to a server, the method comprising:
receiving a client-side scripting language file;

identifying a function to-be-offloaded in the client-side scripting language file;
wherein the function to-be-offloaded has a function body and a list of one or more parameters;
generating an offloaded function based on the function to-be-offloaded;
replacing, in the scripting language file, the function body of the function to-be-offloaded with a set of client-side scripting language instructions which, when executed by an end-user computing device as a result of a call to the function to-be-offloaded, cause one or more arguments, corresponding to the one or more parameters passed into the function to-be-offloaded by the call to the function, to be marshalled and sent to a server in one or more first network messages.

18. The system of claim 17, the method further comprising:
in response to receiving, at the server, the one or more first network messages, invoking the offloaded function, and marshaling and sending results of invoking the offloaded function to the end-user computing device in one or more second network messages.

19. The system of claim 17, the method further comprising: prior to receiving the first network messages, serving the scripting language file, with the function body replaced with the set of client-side scripting language instructions, to the end-user computing device.

20. The system of claim 17, wherein receiving the client-side scripting language file includes receiving a compressed file archive containing the client-side scripting language file.

21. The system of claim 17, wherein identifying the function to-be-offloaded in the client-side scripting language file includes parsing the function body for a client-side scripting language comment containing a predetermine keyword or a predetermined set of keywords.

22. The system of claim 17, wherein identifying the function to-be-offloaded includes reading a manifest identifying the function by name, and parsing the client-side scripting language for a function with the name.

23. The system of claim 17, the method further comprising storing the offloaded function in an offloaded function repository.

24. The system of claim 17, the method further comprising: receiving one or more client-side scripting language files that are part of an overall Web application; wherein generating the offloaded function includes identifying one or more other functions in the one or more client-side scripting language files on which the function to-be-offloaded depends; and generating the offloaded function based on the function to-be-offloaded and the one or more other functions on which the function to-be-offloaded depends.

* * * * *